June 10, 1924.  
E. McCANN  
1,497,339  
METHOD OF ATTACHING PRONGED FASTENERS  
Filed Aug. 23, 1923
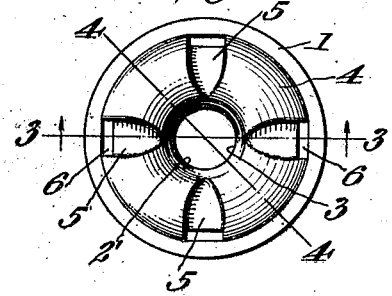
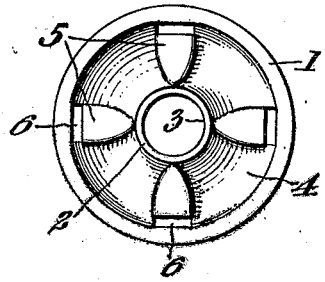
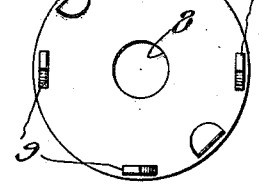
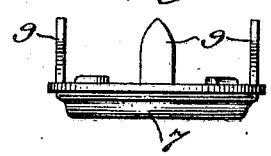
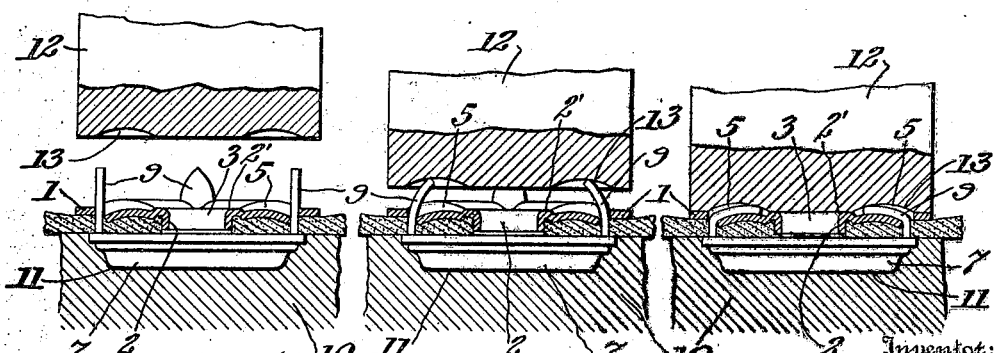
Inventor:  
Edward McCann  
by Wm. F. Finckel  
Attorney.

Patented June 10, 1924.

1,497,339

UNITED STATES PATENT OFFICE.

EDWARD McCANN, OF CHICAGO, ILLINOIS, ASSIGNOR TO SCOVILL MANUFACTURING COMPANY, OF WATERBURY, CONNECTICUT, A CORPORATION OF CONNECTICUT.

METHOD OF ATTACHING PRONGED FASTENERS.

Application filed August 23, 1923. Serial No. 658,967.

*To all whom it may concern:*

Be it known that I, EDWARD MCCANN, a citizen of the United States, residing at Chicago, in the county of Cook and State of Illinois, have invented a certain new and useful Improvement in Methods of Attaching Pronged Fasteners, of which the following is a full, clear, and exact description.

In setting fasteners, such as carriage curtain fasteners, rug fasteners, and others, in which one element of the fastener is provided with attaching prongs adapted to extend through the material to which the fastener element is applied and through suitable openings in a washer placed upon the side of the material opposite to that upon which the fastener element is mounted, it is customary to first bend over and then flatten down or clinch these prongs upon the washer by hammering them with a handtool.

So far as I am aware, flat washers, that is washers having a flat or plane surface only, have been used for this purpose, and it has been found impractical to turn in and flatten down the prongs of the fastener element upon such a washer with less than the two operations last enumerated.

Obviously this use of two separate operations for the mere purpose of clinching the prongs upon the washer for the purpose of attaching the fastener element, is time and labor consuming and tends both to slow up production and increase the cost of articles upon which such fastener elements are used.

It is the object of my invention to provide a method of attaching pronged fastener elements whereby the prongs of the fastener element may be turned in and flattened down or clinched upon the attaching washer by a single operation, thereby making it possible to attach such pronged fastener elements by automatic machinery and eliminating the necessity for the expensive hand-attaching method now in use.

The invention consists in a method of attaching fasteners of the type comprising essentially a pronged member and an attaching washer, the washer being of concavo-convex conformation, whereby by use therewith of a setting plunger or die, or other implement of a conformation complemental to the face of the washer the attaching prongs of the pronged member may be turned in and flattened down upon the washer, so as to conform to its outer face, by a single operation, as I will proceed now to explain and finally claim.

In the accompanying drawings illustrating the invention, in the several figures of which like parts are similarly designated, Figure 1 is a plan view of the outer face of my washer. Fig. 2 is a plan view of the reverse face of the washer from that shown in Fig. 1. Fig. 3 is a section taken in the plane of line 3—3 of Fig. 1 and looking in the direction of the arrows. Fig. 4 is a section on the line 4—4 of Fig. 1. Fig. 5 is a back view of one type of pronged member for use with which the washer of my invention is adapted, and Fig. 6 is a side elevation thereof. Figs. 7, 8 and 9 show in sectional elevation and semi-diagrammatically the attaching operation when my washer is used.

My washer, as shown in the drawings, comprises a flat outer or peripheral edge 1, and a tubular, preferably cylindrical, inner projection or barrel 2 surrounding the opening 3 through which the stud or other connecting member of the complemental part of the fastener to be attached may pass. It will be noted that the barrel is formed with straight sides and a curved edge 2'. The edge 2' is given this curve so that the washer will not bind upon the stud or other connecting member during application and removal of the fastener.

The outer edge 1 provides a surface to bear against the material to which the fastener is attached.

Between the flat outer edge 1 and the barrel 2 the washer is made of concavo-convex conformation, as shown at 4, and this concavo-convex portion is provided with recesses 5, equal in number to the number of prongs of the pronged member of the fastener and sufficiently depressed beneath the outer surface of the portion 4 to accommodate the thickness of the prongs so that when the prongs are clinched they will lie substantially coincident with or below the outer surface of the portion 4 of the washer. Obviously these recesses 5 may be dispensed with if desired, and the prongs clinched upon the outer face of the portion 4 of the washer. Openings 6 are provided for the passage of the prongs.

In Figs. 5 and 6 I have shown a pronged fastener member of the general type for which my washer is designed, this member comprising a socket 7 containing, ordinarily, some type of spring or other snap-action device for engaging the head of any usual or approved stud or other complemental fastener part passed through the opening 3 in the attaching washer and through the opening 8 in the back of the fastener member. In order to attach a fastener member of this type, as above pointed out, the member is provided with prongs 9 adapted to be passed through the material to which the fastener is to be applied and through the openings 6 in the washer and to be thereafter turned in, that is depressed toward each other, and clinched upon the washer.

Referring now to Figs. 7, 8 and 9, I show a die 10 recessed at 11 to receive the fastener member, socket portion down, and with its prongs projecting upwardly. The material to which the member is to be applied is then placed over the fastener member either by forcing the prongs through it or previously providing openings in the material to register with the prongs, and then the washer is positioned over the material with the prongs 9 extending through the openings 6, all as shown in Fig. 7. Obviously an opening is provided for reception of the barrel 2. As shown in Fig. 8, the plunger 12 having a face provided with a concave surface 13, complemental to the convex portion 4 of the washer, is then lowered and the ends of the prongs coming in contact with this concave surface 13 will be turned in or converged, and further lowering or descent of the plunger will force the prongs down to fully clinched position within the recesses 5, as shown in Fig. 9.

It will thus be seen that by the simple expedient of a washer of concavo-convex conformation, and the use therewith of a setting plunger having a concave face complemental to the concavo-convex portion of the washer, I accomplish in a single operation the complete, rapid, and efficient clinching of the prongs of the fastener members upon the washer and obviate the necessity for two operations in attaching fasteners of this type.

It is to be understood that I consider various changes in the particular formation of the washer as within the scope of my invention, the invention being directed to the method for attaching pronged fasteners by the use of a washer having a convex face against which the prongs will lie when in clinched position, as pointed out in the following claims.

What I claim is:—

1. A method of attaching fasteners of the type comprising a pronged member and a washer with which the prongs of said member coact, consisting in supporting the fastener member with its prongs outstanding, arranging the material to which the fastener is to be attached upon the pronged face thereof, applying a washer of convex conformation upon said material with its convexity outward and in position to receive said prongs, and clinching said prongs upon the convex face of the washer by a single movement of a setting implement provided with a prong engaging face of a conformation substantially complemental to the convexity of the face of the washer.

2. A method of attaching fasteners of the type comprising a pronged member and a washer with which the prongs of said member coact, consisting in supporting the fastener member with its prongs outstanding, arranging the material to which the fastener is to be attached upon the pronged face thereof, applying a washer having a convex face provided with prong receiving recesses upon said material in position to receive said prongs, and clinching said prongs upon the convex face of the washer and in said recesses by a single movement of a setting implement provided with a prong engaging face of a conformation substantially complemental to the convexity of the face of the washer.

3. A method of attaching fasteners of the type comprising a pronged member and a washer with which the prongs of said member coact, consisting in supporting the fastener member with its prongs outstanding, arranging the material to which the fastener is to be attached upon the pronged face thereof, applying a washer having a convex face provided with prong receiving recesses upon said material with its convexity outward and in position to receive said prongs, and clinching said prongs upon the convex face of the washer and in said recesses by a single movement of a setting implement provided with a prong engaging face of a conformation substantially complemental to the contour of the face of the washer with the exception of the recesses therein.

In testimony whereof I have hereunto set my hand this 16th day of August A. D. 1923

EDWARD McCANN